United States Patent
Bauer et al.

(10) Patent No.: US 9,428,144 B2
(45) Date of Patent: Aug. 30, 2016

(54) THREE PIECE HIDDEN D-RING SEAT BELT RESTRAINT

(71) Applicant: Ford Global Technologies, LLC, Dearborn, MI (US)

(72) Inventors: William Bauer, Canton, MI (US); John Andrew Stakoe, Bloomfield Hills, MI (US); Mahesh Bhattacharyya, Novi, MI (US); Paul Tuomisto, Grosse Ile, MI (US); Christopher Donald Schop, Chelsea, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 14 days.

(21) Appl. No.: 14/462,709

(22) Filed: Aug. 19, 2014

(65) Prior Publication Data

US 2016/0052487 A1    Feb. 25, 2016

(51) Int. Cl.
*B60R 22/20* (2006.01)
*B60R 13/02* (2006.01)
*B60R 22/24* (2006.01)

(52) U.S. Cl.
CPC ........... *B60R 22/201* (2013.01); *B60R 13/025* (2013.01); *B60R 22/24* (2013.01)

(58) Field of Classification Search
CPC .... B60R 22/201; B60R 13/025; B60R 22/24
See application file for complete search history.

(56) References Cited

U.S. PATENT DOCUMENTS

| | | | |
|---|---|---|---|
| 4,560,204 A | 12/1985 | Zeümer et al. | |
| 5,769,456 A * | 6/1998 | Juchem | B60R 22/023 280/808 |
| 6,106,012 A * | 8/2000 | Boegge | B60R 21/055 280/801.1 |
| 6,254,133 B1 | 7/2001 | Schmid | |
| 7,232,154 B2 | 6/2007 | Desmarais et al. | |
| 2002/0079684 A1* | 6/2002 | Prottengeier | B60R 21/04 280/751 |
| 2005/0242563 A1 | 11/2005 | Daume et al. | |
| 2005/0253366 A1 | 11/2005 | Uno et al. | |
| 2010/0181750 A1* | 7/2010 | Fukuzawa | B60R 22/24 280/801.2 |
| 2014/0367946 A1* | 12/2014 | Osterhout | B60R 13/025 280/730.2 |

FOREIGN PATENT DOCUMENTS

FR    2985481 A1 *   7/2013   ........... B60R 13/025

* cited by examiner

*Primary Examiner* — Faye M Fleming
(74) *Attorney, Agent, or Firm* — Vichit Chea; Price Heneveld LLP

(57) ABSTRACT

A seatbelt assembly includes an adjuster having a guide slidable in a first direction. The assembly also includes a cover defining upper and lower edges and coupled with the guide and first and second extension plates slidably disposed relative to the cover in the first direction so as to be extendable respectively from the upper and lower edges thereof and to be retractable behind the cover.

20 Claims, 6 Drawing Sheets

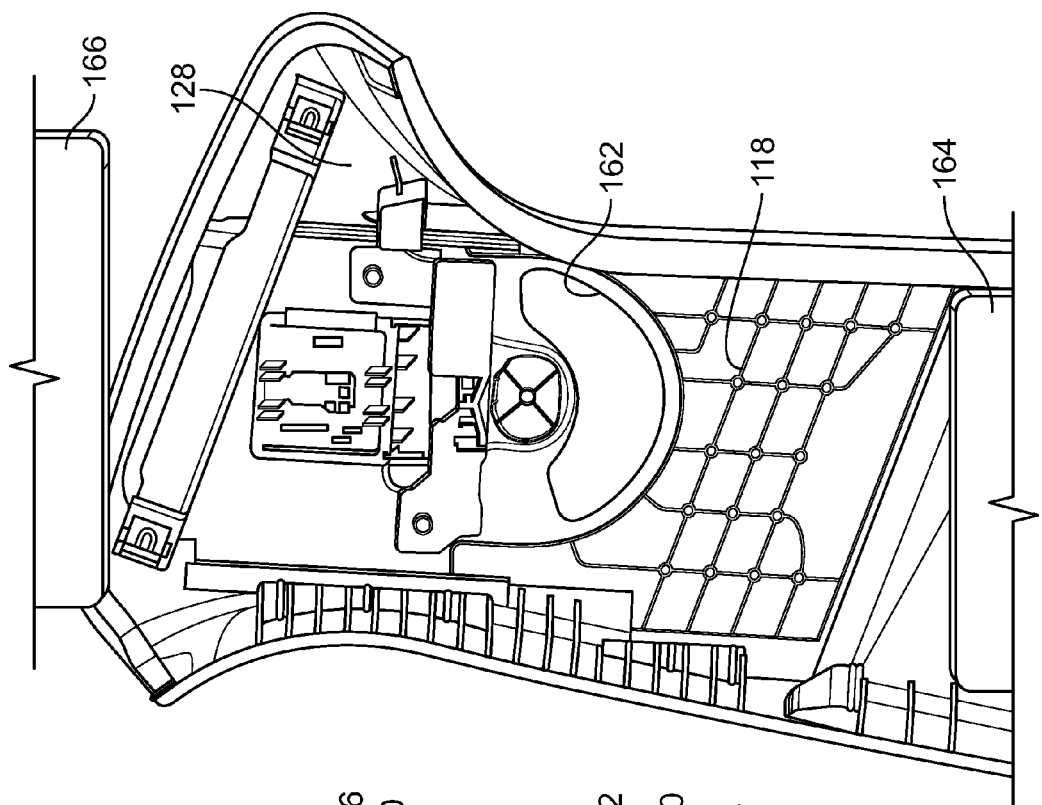
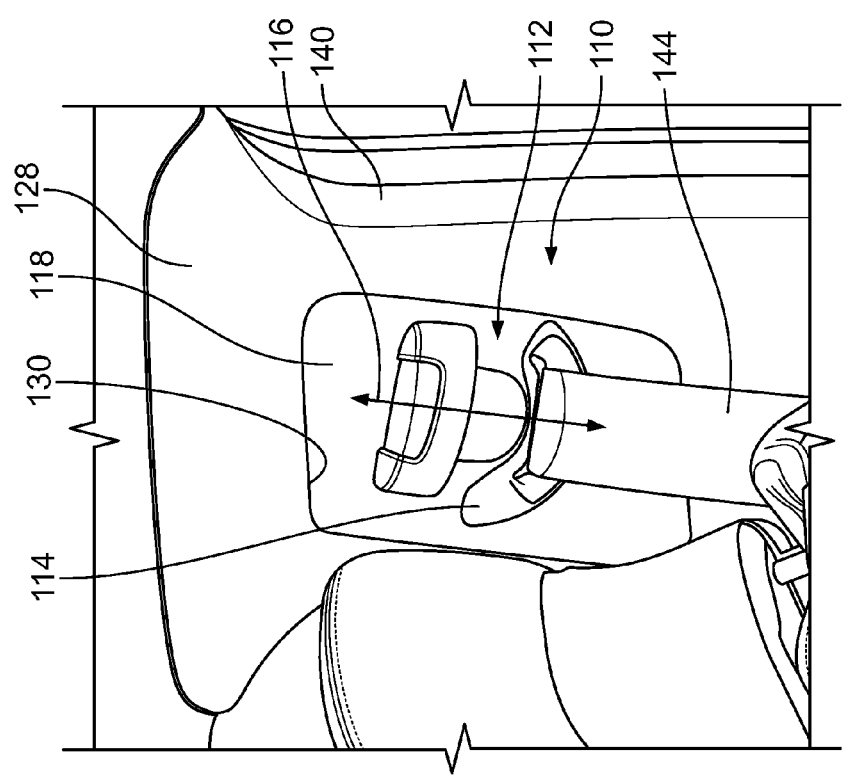

THREE PIECE HIDDEN D-RING SEAT BELT RESTRAINT

FIELD OF THE INVENTION

The present invention generally relates to a seatbelt assembly with a height adjustment mechanism. The assembly has a hidden guide structure with a multi-part cover.

BACKGROUND OF THE INVENTION

Variations of seatbelt assemblies are included in motor vehicles that have adjustable components. In one example, seatbelt assemblies include guides for the positioning of the shoulder portion of the seatbelt webbing strap that are adjustable in height. Such height adjustment may allow the wearer of the seatbelt to position the upper end of the seatbelt webbing to comfortably and securely contact the shoulder to extend over his or her torso.

Different types of structures may be used to achieve an adjustable seatbelt webbing guide for the shoulder portion thereof. Such structures may involve slidably coupling the guide along a track that is anchored to the body of the vehicle, such as on the B-pillar (for front passenger seatbelts) or the C-pillar (for rear passenger seatbelts), for example. In some instances, both the guide and the portion of the seatbelt webbing inward of the guide (i.e. between the seatbelt spool and the guide) are hidden generally behind an interior panel of the vehicle that extends upwardly along the associated pillar toward, for example, the ceiling of the cabin. Such structures may be referred to as a "hidden D-ring" arrangement, the guide being referred to as a D-ring, and may include a slidable cover for the guide and associated adjustment mechanism inset within the vehicle panel.

To provide for appropriate hiding of the guide and adjustment mechanism throughout the range of movement thereof, the covers have been of a length that is greater than both the range of adjustment and the associated opening in the panel within which the cover is inset. However, the available space for the cover within the interior panel and adjacent the structure of the vehicle pillar may limit the range of motion for the guide adjustment to less than what would otherwise be available and to less than what some wearers may find comfortable. Accordingly, further advances are desired.

SUMMARY OF THE INVENTION

According to one aspect of the present invention, a seatbelt assembly includes an adjuster having a guide slidable in a first direction. The assembly also includes a cover defining upper and lower edges and coupled with the guide and first and second extension plates slidably disposed relative to the cover in the first direction so as to be extendable respectively from the upper and lower edges thereof and to be retractable behind the cover.

According to another aspect of the present invention, a vehicle includes a structural pillar and a seatbelt adjuster having a track coupled with the pillar and a guide slidable along the track. A panel assembly is included in the vehicle and has a cover defining upper and lower edges and coupled with the guide. The panel assembly also has first and second extension plates slidably disposed relative to the cover so as to be extendable respectively from the upper and lower edges thereof and to be retractable behind the cover.

According to another aspect of the present invention, a vehicle interior panel assembly includes a panel defining a window therein having a height. A cover is coupled with the body to be slidable along a distance. The cover has a length of less than a sum of the height of the window and the distance by a gap length. First and second extension plates are slidably coupled with the body, each having a length greater than the gap length.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 6 is a partial interior view of a vehicle having a related art seatbelt assembly; and FIG. 7 is an interior view of a vehicle interior panel and components associated with the related art seatbelt assembly of FIG. 6.

DETAILED DESCRIPTION OF THE PREFERRED EMBODIMENTS

Figure 1:
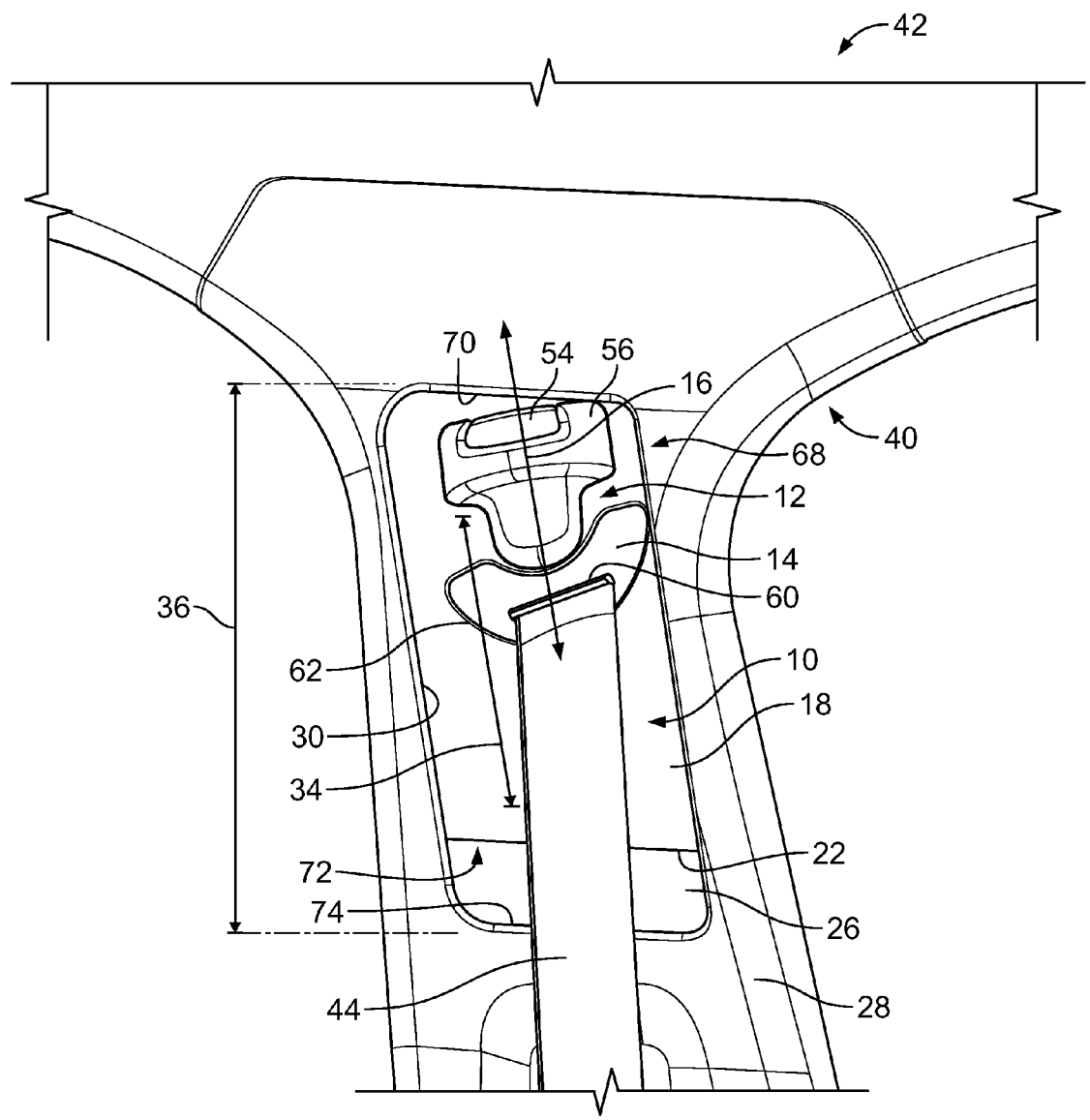
FIG. 1 is a front elevational view of a vehicle pillar including a height adjustment mechanism for a seatbelt assembly thereof.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, reference numeral 10 generally designates a seatbelt assembly. Seatbelt assembly 10 includes an adjuster assembly 12 having a guide 14 slidable in a first direction 16. A cover 18 defines upper 20 and lower 22 edges and is coupled with the guide 14. A first extension plate 24 (FIG. 3) and a second extension plate 26 are slidably disposed relative to the cover 18 in the first direction 16 so as to be extendable respectively from the upper edge 20 and the lower edge 22 of the cover 18 and to be retractable behind the cover 18.

Figure 2:
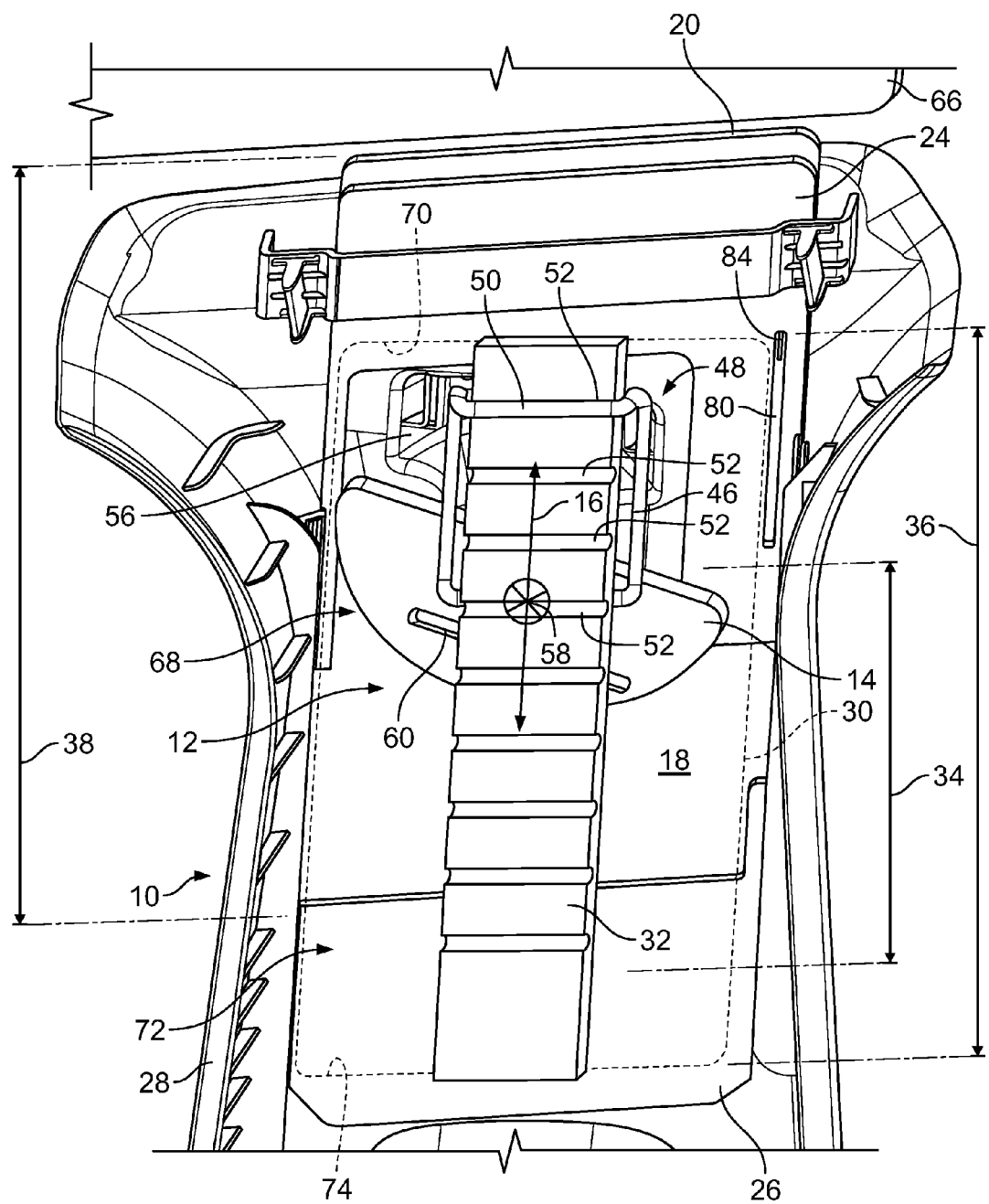
FIG. 2 is an interior view of components of the seatbelt assembly, including the height adjustment mechanism, and a vehicle interior panel associated with the pillar.

As shown in FIGS. 1 and 2, assembly 12 further includes a vehicle interior panel 28 that overlies the adjuster assembly 12 to conceal the mechanism associated therewith (as described further below). Panel 28 defines a window 30 therein, which extends at least over an area through which guide 14 is slidable along direction 16. As illustrated in FIG.

2, guide 14 can be slidably disposed along a track 32 that is included in adjuster assembly 12 and is positioned on an interior surface of vehicle panel 28. Guide 14 can be configured to be slidably adjustable along track 32 through a length 34 that is determined by a number of factors, including consideration of a generally useful range of adjustment for users of seatbelt assembly 10, along with the ability of the seatbelt assembly 10, including the various components discussed herein to fit within an available space.

As further shown in FIGS. 1 and 2, seatbelt assembly 10 can be adapted for use in a position along a vehicle pillar 40, such as a front driver- or passenger-side seat, such that vehicle pillar 40 is a B-pillar of vehicle 42 (only a portion of which is shown in the Figures). As such, the adjuster assembly 12 can be in the form of a shoulder-height adjuster, which, by way of a guide 14, can be used to adjust the height at which the webbing strap 44 extends outwardly from B-pillar 40. This adjustment allows the user to select the height at which the webbing strap 44, which is in the form of the shoulder strap of the seatbelt, extends from the vehicle to comfortably correspond with the height of the user's shoulder. Because of the large variation in heights of various passengers of motor vehicles, it is desirable to have guide 14 adjustable through a length 34 that may be limited by the packaging of the relevant portions of seatbelt assembly 10 between adjacent vehicle components.

As further shown in FIG. 2, track 32, which is mounted to adjacent locations of the interior structure (not shown) of pillar 40 has guide 14 slidably coupled therewith by means of a carrier 46 that is operatively engaged along track 32 and has guide 14 pivotally coupled therewith. The illustrated carrier 46 is only an example of such a structure and other variations of carrier 46, as well as track 32 can be used in a similar assembly 10 in accordance with the embodiments discussed herein. Carrier 46 can further include a locking mechanism 48 that secures carrier 46, and accordingly guide 14, in a selected position along track 32, while being selectively releasable to allow adjustment of the position of carrier 46 along length 34. An example of such a locking mechanism 48 is shown in FIG. 2 but can vary according to the particular application thereof. In the example shown, locking mechanism 48 includes a latch 50 that is engageable with one of a plurality of slots 52 formed in track 32. Latch 50 is biased into engagement with slot 52 and can be moved outwardly therefrom to permit movement of carrier 46 along track 32. As shown in FIG. 1, a button 54 can be operatively coupled with latch 50 to allow a user to disengage or otherwise control latch 50 with an associated one of slots 52. As shown, button 54 can be available for manipulation by a user along a housing portion 56 of cover 18, which can be adapted to provide space for associated components of the locking mechanism 48 and to provide the user with a rigid feature to help to press button 54.

As further shown in FIG. 2, guide 14 can be in the form of what is generally referred to as a D-ring that is pivotally coupled to carrier 46 along a pivot point 58. Guide 14, as mentioned above, is configured to position an upper end of seatbelt webbing strap 44 with respect to vehicle pillar 40, and accordingly includes a slot 52 therein to slidably receive a related portion of webbing strap 44 as it is drawn out from a retracted position and during movement of the user during use of seatbelt assembly 10. As shown, guide 14 completely surrounds slot 52 so as to retain webbing strap 44 therein and is accordingly of a size that is at least as wide a webbing strap 44, with a necessary additional size to provide a desired strength for the associated portion of seatbelt assembly 10. Further, the pivotal coupling of guide 14 to carrier 46 is such that the position of slot 52 can rotate within a given range about pivot point 58 to accommodate a range of angles at which webbing strap 44 can extend from guide 14.

Returning to FIG. 1, because interior panel 28 is fixed relative to pillar 40, clearance must be made for the above-mentioned moveable portions of seatbelt assembly 10 that are available for use, or otherwise extend through, interior panel 28. Such features include webbing strap 44 and the associated features of guide 14, including slot 52, as well as button 54 and related portions of housing area 56 of cover 18. Accordingly, window 30 is present within interior panel 28 to allow the above-mentioned components to pass through panel 28. Further, window 30 is of a length 36 sufficient to allow movement of guide 14 through length 34 along track 32, while allowing for the above-described movement of slot 52 during pivoting of guide 14 about pivot point 58. Further, window 30 is sized to accommodate movement of button 54 as it moves in direction 16 along with the movement of guide 14. Accordingly, it may be necessary for the length 36 of window 30 to be at least equal to the length 34 of travel of guide 14 along track 32, plus any distance between slot 60 in guide 14 and opposite surface of button 54. Further, window 30 may have a width that is greater than the width of webbing strap 44 by a distance sufficient to accommodate pivoting of guide 14 about the pivot point 58. As shown in FIG. 1, a window 30 of such dimensions opens a large area of interior panel 28 through which portions of adjuster assembly 12 and/or portions of the internal structure of pillar 40 will be visible. In an example, length 36 of window 30 can be between 150 cm and 225 cm.

Cover 18 is positioned within window 30 and is slidable with the assembled carrier 46, guide 14, and locking mechanism 48 to conceal the components that would otherwise be exposed by window 30. In the example shown, cover 18 is slidably coupled with interior panel 28 along an interior thereof (i.e. within an open area formed between interior panel 28 and the adjacent portions of vehicle pillar 40). As shown, cover 18 is dimensioned to extend over the width of window 30. Further, cover 18 extends over portions of carrier 46, guide 14, and locking mechanism 48 to hide the internal components, thereof and further extends away therefrom both upward and downward along direction 16.

In the related art seatbelt assembly 110 shown in FIGS. 6 and 7, a single-piece cover 118 is used to fill window 130 through the entire movement of guide 114 therein. In such an arrangement, for cover 118 to extend along an entire length of window 130, while sliding with guide 114 through the entire range of motion thereof, cover 118 must have a length that is at least equal to the length of window 130 plus the length of travel of guide 114 along track 132.

As shown in FIG. 7, portions of the seatbelt assembly 110 associated with vehicle pillar 140, including both adjuster assembly 112 and cover 118, are positioned adjacent other vehicle components 166 and 164. Such components may be structural elements of the vehicle roof or pillar 140, other components of the seatbelt assembly 110, side air bag units (which may be positioned in a portion of pillar 40), or portions of a curtain air bag assembly, (which may be positioned along an upper portion of pillar 40 or within the ceiling adjacent thereto). Accordingly, in the case of related art covers 118, the size of cover 118 may be the limiting factor with respect to the range of motion 134 of guide 114. As illustrated in FIG. 6, a single piece cover 118 may be the tallest portion of assembly 110, in particular when considering the range of motion through which cover 118 travels during movement of guide 14. Accordingly, the tallest cover 118 that may slidably fit within the available area between components 164 and 166 may be smaller than a distance that would otherwise be available for the movement of guide 114.

Returning to FIGS. 1 and 2, for cover 18 to be useable through a length 34 of adjustment of guide 14 that is less limited by space available for the length 38 of cover 18, cover 18 is undersized relative to the length 36 of window 30 for the given length 34 of adjustment for guide 14. As shown, while cover 18 may have a length 38 that is still greater than the overall length 36 of window 30, length 38 of cover 18 may be less than the total of the length 36 of window 30 and the length 34 of movement of guide 14 along track 32. In an embodiment, the length 38 of cover 18 may be 80% or less of the sum of the length 36 of window 30 and the length 34 of guide 14 adjustment. Accordingly, as shown in FIG. 1, when guide 14 is in an upper position 68, wherein button 54 is positioned adjacent upper edge 70 of window 30, a gap 72 may be present between the lower edge 22 of cover 18 and an adjacent lower edge 74 of window 30, which is spaced apart therefrom. Similarly, as shown in FIGS. 3 and 4, when guide 14 is in a lower position 76 with aperture 62 in cover 18 (which is aligned with slot 60 in guide 14) positioned adjacent lower edge 74 of window 30, upper gap 78 may be present between upper edge 20 of cover 18 and upper edge 70 of window 30.

To prevent internal components from being visible through gaps 72 and 78, when present, extension plates 24 and 26 are further slidably coupled with vehicle interior panel 28 in respective overlapping manners with upper edge 20 and lower edge 22 of cover 18. In other arrangements, first extension plate 24 and second extension plate 26 can be slidably coupled with other portions of assembly 10, such as with cover 18, track 32, or the like. In any such arrangement, the overlapping, sliding arrangement between both first extension plate 24 and cover 18 and second extension plate 26 and cover 18 allow for first and second extension plates 24 and 26 to respectively and alternately extend outwardly from and retract behind cover 18. The outward extension of extension plates 24 and 26 allows them to close, respectively, upper gap 78 and lower gap 72, when present. The retraction of extension plates 24 and 26 allows them to retract behind cover 18, when guide 14 is positioned such that gaps 72 and 78 are not present, thereby reducing the total amount of space internal to vehicle panel 28 needed for cover 18 to accommodate a given length 34 of movement for guide 14 along track 32.

As shown in FIGS. 1 and 2, where, as mentioned above, guide 14 is in upper position 68 with cover 18 positioned accordingly, with lower gap 72 present within window 30. As also mentioned above, second extension plate 26 is in a position where it extends beyond lower edge 22 of cover 18 to obscure gap 72. As shown in FIG. 2, when guide 14 is in upper position 68, first extension plate 24 is retracted behind cover 18 such that upper edge 20 of cover 18 can extend toward an upper limit of a slidable area therefor on the inside of interior panel 28. For example, such an upper limit can be bounded by an upper component 66, which, as mentioned above, can be in the form of a curtain air bag assembly or the like. By retracting behind cover 18, first extension plate 24 can also fit within such a designated space adjacent to, for example, upper component 66.

Figure 3:
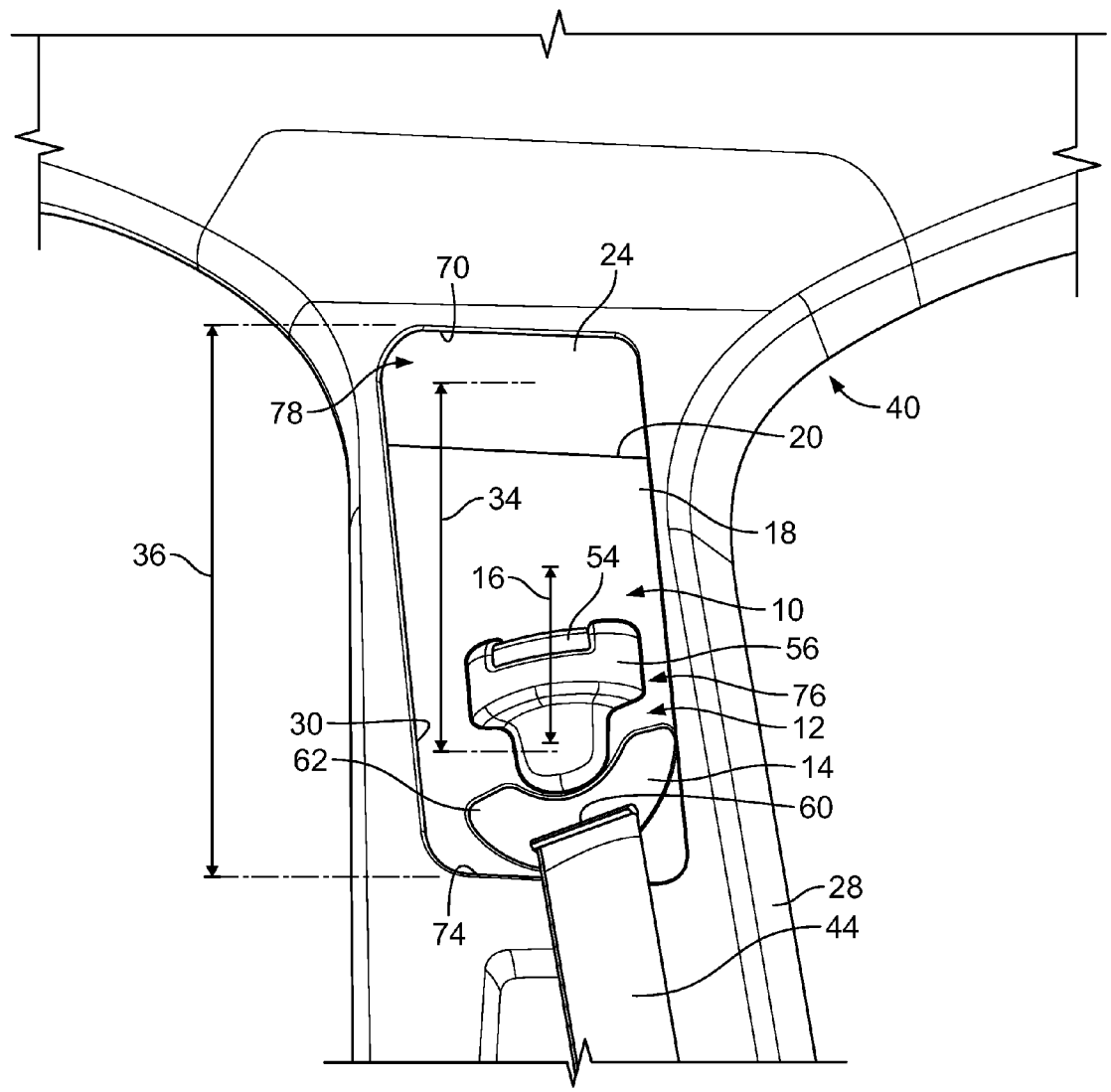
FIG. 3 is a front elevational view of the vehicle pillar of FIG. 1 with the height adjustment mechanism thereof in a second configuration.
Figure 4:
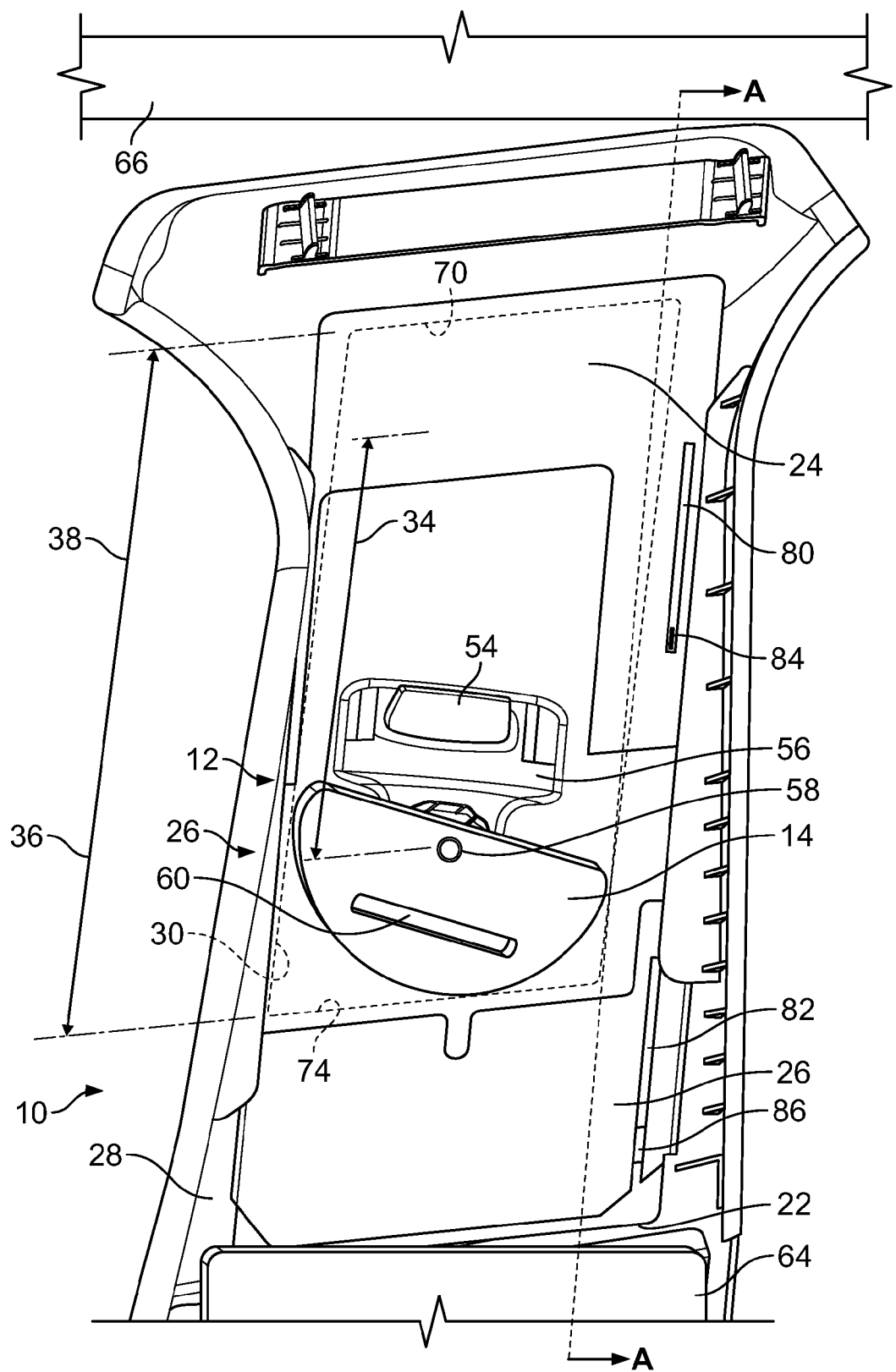
FIG. 4 is an interior view of the components of the seatbelt assembly and the vehicle interior panel associated with the pillar corresponding to the second configuration.

As shown in FIGS. 3 and 4, assembly 10, including the overlapping cover 18, first extension plate 24 and second extension plate 26, can similarly accommodate movement of guide 14 toward a lower position 76. As illustrated, when guide 14 is moved into the lower position 76 along track 32 (which is not shown in FIG. 4 for clarity) an upper gap 78 is present between upper edge 20 of cover 18 and upper edge 70 of window 30. In this arrangement, first extension plate 24 is extended outwardly relative to cover 18 so as to extend over gap 78, thereby enclosing window 30. As further shown in FIG. 4, when guide 14 is in a lower position 76, second extension plate 26 is in a refracted position with respect to cover 18 such that cover 18 can extend to a lower boundary of the available area on the inside of interior panel 28, which in FIG. 4 is shown as being defined by component 64. Accordingly, first and second extension plates 24 and 26 can each have respective lengths of at least the difference between the length 38 of cover 17 and the sum of the length 36 of window and the length 34 of travel of guide 14. Further, the positioning of second extension plate 26 in the retracted position relative to cover 18 is further such that second extension plate 26 can also fit within such an available space. Accordingly, such an arrangement allows for cover 18 to be short enough to fit within the available space, depicted as a distance between components 64 and 66, while still providing structure to adequately enclose window 30 and conceal interior components of assembly 10 from view.

The extending and retracting movement of both first extension plate 24 and second extension plate 26 with respect to cover 18 during movement thereof, can be driven by adjustment of guide 14 along track 32 and can take on a variety of characteristics. For example, when guide 14 is moved from lower position 76 to upper position 68, second extension plate 26 can remain stationary, as can first extension plate 24 through initial movement of cover 18. This can act to respectfully extend second extension plate 26 and retract first extension plate 24 with respect to cover 18 due to the relative movement therebetween. Cover 18 can be respectively operatively coupled with both first extension plate 24 and second extension plate 26, such as by the depicted inter-engaging slots 80 and 82 respectively extending through portions of first extension plate 24 and second extension plate 26 and corresponding tabs 84 and 86 extending from cover 18. Such coupling can be such that movement of cover 18, during adjustment of guide 14, can correspondingly urge both first extension plate 24 and second extension plate 26 into appropriate positioning within upper gap 78 and lower gap 72, as needed, and can further help to position both first extension plate 24 and second extension plate 26 out of the way of additional components of assembly 10, such as slot 60 or locking mechanism 48.

Figure 5:
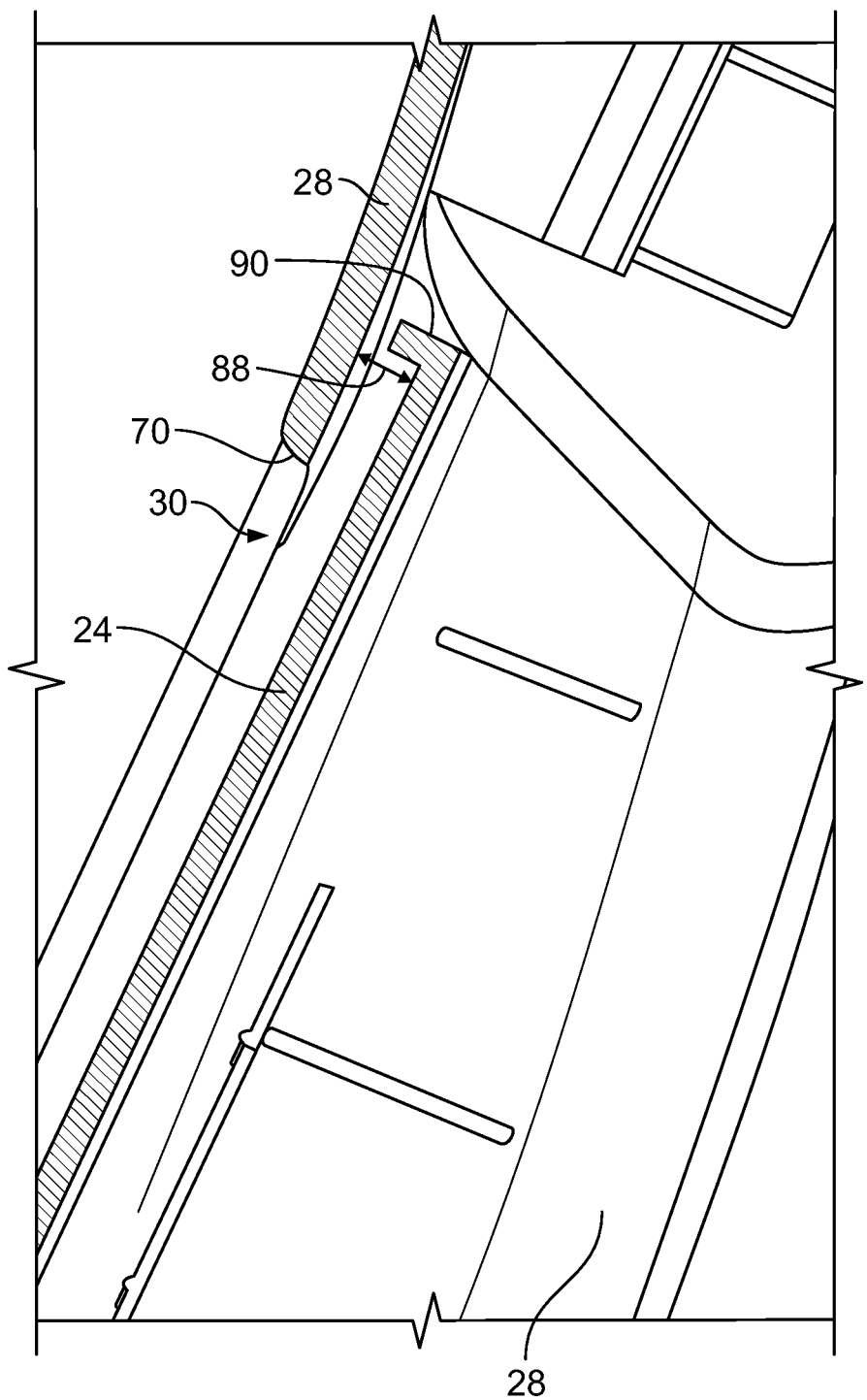
FIG. 5 is a detail view of a cross section of the vehicle panel and related components taken along line A-A in FIG. 4.

Further, as shown in FIG. 5 first extension plate 24, for example, can include an extension flange 90 that can help to close any visible gap 88 that may be present between first extension plate 24 and the adjacent upper edge 70 of window 30 that may be present due to a convexity (or other non-planar structure) within vehicle interior panel 28. Further, flange 90 can be present, extending generally perpendicular to the remaining portion of first extension plate 24, to compensate for any spacing between first extension plate 24 and a corresponding interior of vehicle interior panel 28 due to the overlapping arrangement of first extension 24 and cover 18 by being positionable adjacent panel 28 in the area of edge 70. Similarly, although not shown in the Figures, second extension plate 26 can include a similar flange that can be adapted to close any gaps that may exist between second extension plate 26 and adjacent portions of vehicle interior panel 28.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A seatbelt assembly, comprising:
an adjuster having a guide slidable in a first direction;
a cover defining upper and lower edges and coupled with the guide; and
upper and lower extension plates slidably disposed relative to the cover in the first direction on opposite sides of the cover so as to be extendable respectively from the upper and lower edges thereof and to be retractable behind the cover.

2. The seatbelt assembly of claim 1:
further including a vehicle interior panel overlying a portion of the adjuster and defining a window therein; and
wherein:
the guide is slidable through a first distance;
the window has a length in the first direction of at least the first distance; and
the cover has a length in the first direction of less than a sum of the first distance and the length of the window.

3. The seatbelt assembly of claim 2, wherein the upper and lower extension plates have respective lengths in the first direction at least equal to a difference between the length of the cover and the sum of the first distance and the length of the window.

4. The seatbelt assembly of claim 2, wherein the cover and the upper and second extension plates are slidably coupled with the vehicle interior panel.

5. The seatbelt assembly of claim 2, wherein the length of the cover is less than 80% of the sum of the first distance and the length of the window.

6. The seatbelt assembly of claim 1:
further including a webbing strap slidably extending through the guide; and
wherein the cover defines an aperture therethrough that is substantially aligned with a portion of the guide such that the webbing strip further passes therethrough.

7. The seatbelt assembly of claim 1, wherein:
the adjuster further includes a track with which the guide is slidably coupled and a latch releasably coupled between the track and the guide; and
the cover includes a button operably coupled with the latch to control the releasable coupling thereof.

8. A vehicle comprising:
a structural pillar;
a seatbelt adjuster having a track coupled with the pillar and a guide slidable along the track; and
a panel assembly, including:
a cover defining upper and lower edges and coupled with the guide; and
upper and lower extension plates oppositely and slidably disposed relative to the cover so as to be extendable respectively from the upper and lower edges thereof and to be retractable behind the cover.

9. The vehicle of claim 8, wherein the panel assembly further includes a panel coupled with the pillar and defining an interior within which the seatbelt adjuster is concealed, the cover and the upper and lower extension plates being slidably coupled with the panel body.

10. The vehicle of claim 9, wherein:
the panel defines a window therein;
the guide is slidable through a first distance along a first direction along the track;
the window has a length in the first direction of at least the first distance; and
the cover has a length in the first direction of less than a sum of the first distance and the length of the window.

11. The vehicle of claim 10, wherein the upper and lower extension plates have respective lengths in the first direction at least equal to a difference between the length of the cover and the sum of the first distance and the length of the window.

12. The vehicle of claim 8:
further including a seatbelt webbing strap slidably engaged through the guide of the seatbelt adjuster; and wherein the cover defines an aperture therein generally aligned with the guide, the length of the seatbelt webbing further extending through the aperture.

13. The vehicle of claim 8, wherein:
the guide of the seatbelt adjuster is slidable within a panel interior space having an upper boundary and a lower boundary;
the cover is slidable between a first position in which the upper edge is adjacent the upper boundary and a second position in which the lower edge is adjacent the lower boundary.

14. The vehicle of claim 13, wherein:
when the cover is in the first position, the upper extension plate is retracted behind the cover and the lower extension plate is extended beyond the lower edge; and
when the cover is in the second position, the lower extension plate is retracted behind the cover and the upper extension plate is extended beyond the upper edge.

15. A vehicle interior panel assembly, comprising:
a panel defining a window therein having a height;
a cover coupled with the panel to be slidable along a distance and having a length of less than a sum of the height of the window and the distance by a gap length; and
upper and lower extension plates slidably coupled with the panel on opposite sides thereof, each extension plate having a length greater than the gap length.

16. The panel assembly of claim 15, wherein:
the window defines an upper edge and a lower edge;
the cover defines an upper edge and a lower edge; and
the coupling of the cover with the panel is such that the cover is slidable between a first position in which the upper edge of the cover is positioned above the upper edge of the window and the lower edge of the cover is within the window and spaced apart from the lower edge thereof and a second position in which the lower edge of the cover is positioned below the lower edge of the window and the upper edge of the cover is within the window and spaced apart from the upper edge thereof.

17. The panel assembly of claim 16, wherein:
when the cover is in the first position, the lower extension plate extends between the lower edge of the cover and the lower edge of the window; and
when the cover is in the second position, the upper extension plate extends between the upper edge of the cover and the upper edge of the window.

18. The panel assembly of claim 16, wherein:
when the cover is in the first position, the upper extension plate is retracted substantially behind the cover; and
when the cover is in the lower position, the extension plate is retracted substantially behind the cover.

19. The panel assembly of claim 15, wherein the cover defines a seatbelt webbing aperture and includes a seatbelt adjustment button disposed thereon, the cover being slidably disposed within the window such that the aperture and the button are moveable within the window in a direction between the upper and lower edges thereof.

20. The panel assembly of claim 15, wherein:
the panel defines a surface surrounding the window having a convex portion adjacent the upper edge thereof such that the upper edge is non-planar with respect to the cover and the upper extension plate; and
the upper extension plate includes a body and a flange extending therefrom, the upper extension plate being positionable with respect to the panel body such that the flange extends generally perpendicular from the body thereof toward the upper edge of the window.

* * * * *